T. B. ATTERBURY.
MANUFACTURE OF GLASSWARE.
No. 172,946. Patented Feb. 1, 1876.
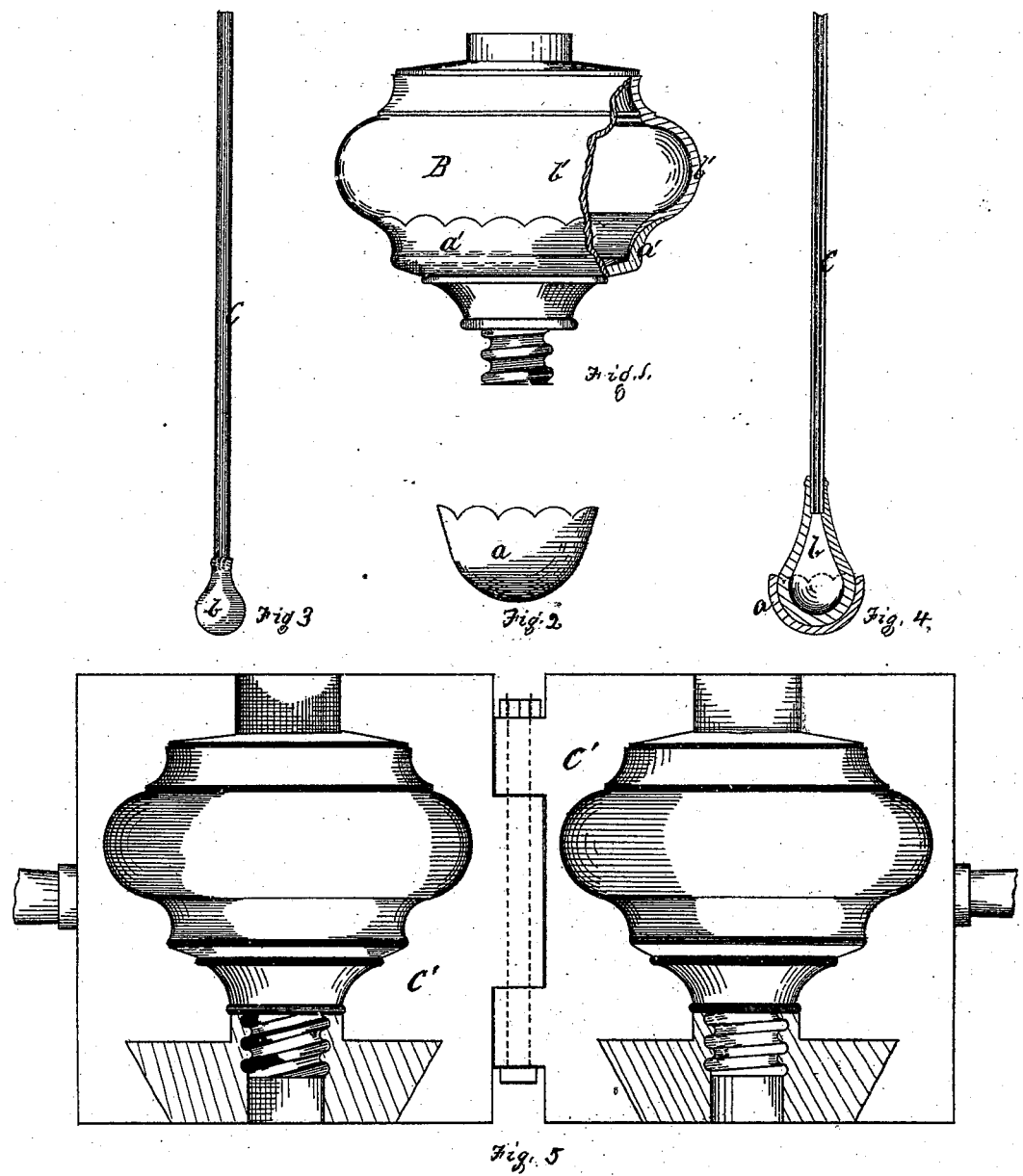

UNITED STATES PATENT OFFICE.

THOMAS B. ATTERBURY, OF PITTSBURG, PENNSYLVANIA, ASSIGNOR TO T. B. AND J. S. ATTERBURY.

IMPROVEMENT IN THE MANUFACTURE OF GLASSWARE.

Specification forming part of Letters Patent No. 172,946, dated February 1, 1876; application filed January 10, 1876.

*To all whom it may concern:*

Be it known that I, THOMAS B. ATTERBURY, of Pittsburg, in the county of Allegheny and State of Pennsylvania, have invented a new and useful Improvement in the Manufacture of Glassware; and I do hereby declare the following to be a full, clear, and exact description thereof, reference being had to the accompanying drawing, forming part of this specification, and illustrating one manner of applying my invention and one class of glassware to which it is applicable.

Figure 1 is a lamp-bowl, formed of glass of different colors. Fig. 2 is a shell of glass of a single color. Fig. 3 represents a pipe, with the gathering; Fig. 4, a section of the pipe, gathering, and shell; Fig. 5, an ordinary mold.

Like letters refer to like parts wherever they occur.

My invention relates to the manufacture of hollow glassware, composed of two or more different colored glass; and it consists, first, in a hollow article of glassware, composed of glass of two or more colors, the surface of the article at and near the junction of any two colors being uniform, or nearly so, and the glass on one side of the apparent line of demarcation approximating in thickness that upon the opposite side of the line; second, in forming hollow articles of parti-colored glass, by combining a shell of one color with a gathering of another color, and then completing the article by the usual method of forming blown ware.

Heretofore in the manufacture of hollow glassware, composed of two or more colors, the practice has been to form a portion of the article of one color, and of the required size for the finished article, and blow or press the remainder of the article from glass of a different color, uniting the two at the time the final portion is blown or pressed, thus obtaining an article, portions of which were in relief, or to gather from two or more different colors, and after having blown and shaped the article to cut away the glass in such a manner as to expose the different colors. In either case the surface of the glass will be irregular, and portions will be in relief.

The object of my invention is to obtain an article of uniform, or nearly uniform, surface, and of equal, or nearly equal, thickness throughout.

I will now proceed to describe my invention so that others skilled in the art to which it appertains may apply the same.

I first press up or otherwise form a shell, *a*, of glass of any desired color, giving to the edge of the shell the form or configuration which is required at the line of junction. This shell will be of less diameter than the corresponding part of the finished article, often in the proportion of one to three, dependent on the article to be produced. I next take the ordinary pipe and gather a portion of glass of a different color from that of the shell, and after blowing up the gathering slightly I stick the shell *a* to the gathering, and then reheat or warm the same in the "glory hole," obtaining a weld or union of the shell and gathering, after which the article is blown in a mold corresponding in form to the article to be produced, and finished in the usual manner.

In the drawing, B represents a lamp-bowl of two colors, *a' b'*, *a'* being the expanded shell *a*, and *b'* being the gathering *b*, with which the shell was united, as before specified. C and C' are the usual blow-pipe and an ordinary mold.

From the very nature of the process specified it is evident that the different colored glass, being united previous to blowing or forming the article, must expand equally thereafter and give a shell of uniform, or nearly uniform, thickness and surface, as the gathering and shell is in reality a unit; and it is further evident that the shell *a* being first pressed or independently formed, any shape may be given to the edge or lip and the form of line of union between the different colored glass. Predetermined care should be taken in the several steps to center the shell, and especially so when shaping in the mold or otherwise.

By the process specified globes, chimneys, bowls, bells, and like articles known to the trade may be formed without further directions or detailed description, and footed ware of several colors may be made by pressing the stem and foot of any given color, and forming the bowl of two or more colors, as specified.

Having thus described my invention, what I claim, and desire to secure by Letters Patent, is—

1. A hollow article of glassware, composed of glass of two or more colors, the surface of the article at and near the junction of any two colors being uniform, or nearly so, and the glass on one side of the line of demarcation approximating in thickness that upon the opposite side, substantially as specified.

2. As an improvement in the manufacture of parti-colored hollow glassware, combining a previously formed shell of one color with a gathering of another color, and then warming in and completing the article in the usual manner of forming blown glassware.

In testimony whereof I, the said THOMAS B. ATTERBURY, have hereunto set my hand.

THOS. B. ATTERBURY.

Witnesses:
T. B. KERR,
F. W. RITTER, Jr.